Oct. 13, 1959 E. F. MOGREN 2,908,100
ICE FISHING TIP-UP
Filed July 25, 1957
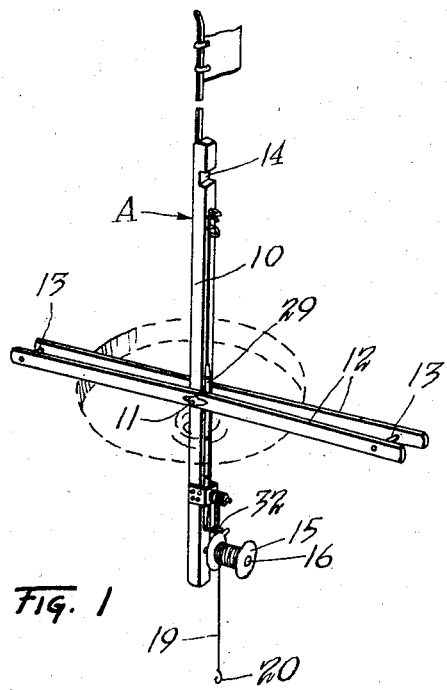
INVENTOR
Eben F. Mogren
BY
ATTORNEY United States Patent Office 2,908,100
Patented Oct. 13, 1959

2,908,100

ICE FISHING TIP-UP

Eben F. Mogren, Weaver, Minn.

Application July 25, 1957, Serial No. 674,166

3 Claims. (Cl. 43—17)

This invention relates to an improvement in ice fishing tip-up and deals particularly with a signalling device which provides a visible indication when a fish takes the suspended bait.

In fishing through the ice, it is common practice for the fisherman to cut a hole through the ice and to suspend a line bearing a hook and bait into the water. The upper end of the line is often wound upon a reel which is secured from a considerable length. A spring strip is bent into a loop and the free end of the spring is engaged in a suitable catch near the top of the mast. When a sufficient pull is exerted upon the line tending to rotate the reel, a projection on the reel pivots a trigger mechanism which disengages the free end of the spring strip from the catch and permits the strip to spring up into substantially vertical position. Thus, an indication is provided when a fish is caught upon the hook.

While such devices operate effectively, particularly in lakes where there is no particular current, some difficulties are experienced in using the devices while fishing in rivers where the amount of current may vary. The problem is emphasized when a large minnow is used as bait as the pull upon the hook caused by the swimming of the minnow, particularly combined with the force of a current of water, is often sufficient to exert sufficient force upon the reel to operate the trigger and thereby cause a false signal. It is the purpose of the present invention to provide a means of varying the force required to operate the trigger to compensate for varying degrees of current as well as varying sizes of minnows. In other words, if the bait is suspended in a portion of a river which has a relatively swift current and if a minnow of large size is to be used as bait, the apparatus may be adjusted so that more force is required to operate the trigger, thus preventing the likelihood of false signals. On the other hand, if the bait is suspended in relatively calm waters and if a small minnow is used as bait, the force required to operate the trigger may be materially reduced so that the apparatus will function properly in varying locations and under varying circumstances.

A feature of the present invention resides in the provision of an arm which is preferably pivotally attached to the mast at a point adjoining the reel and in providing a means of applying an adjustable pressure thereagainst tending to resist pivotal movement of the arm. This arm is swingable against the trigger mechanism which is actuated by rotative movement of the reel. Accordingly, in order to release the trigger mechanism, it is necessary for this arm to be pivoted out of the way of the potion of the trigger mechanism actuated by the reel. As a result, there is an added resistance to actuation of the trigger mechanism by the reel, thus preventing false signals in areas where the force of the current normally exerts a considerable pull upon the line.

A feature of the present invention lies in the improvement of a structure such as that shown in Patent 2,651,- 875 to Brockman where the only force which resists the unreeling of the line comprises the friction in the trigger mechanism and the force required to disengage the end of the spring from the trigger mechanism.

These and other objects and novel features of the present invention will be more clearly and fully set forth in the following specification and claims.

In the drawings forming a part of the specification:

Figure 1 is a perspective view of the tip-up device in readiness for use, a portion of the spring being broken away to show the free end of the spring in signalling position.

Figure 2 is an enlarged perspective view of the upper end of the device shown in Figure 1, and showing the spring in nonsignalling position.

Figure 3 is a side elevational view of the trigger mechanism shown in Figure 2.

Figure 4 is a front elevational view of the lower portion of the mast showing the portion of the trigger mechanism actuated by the reel.

Figure 5 is a view similar to Figure 4 showing the trigger mechanism in reel engaging position.

Figure 6 is a sectional view through a portion of the mast and the friction supplying arm.

The tip-up is indicated in general by the letter A and includes a vertical mast 10 which is pivotally connected by a clamping bolt 11 to a pair of spanner members 12 arranged in spaced parallel relation on opposite sides of the mast 10. Dowels such as 13 connect the ends of the spanner members 12 and serve as a means of holding these members in proper parallel relation. The spanner members 12 may swing into parallel relation with the mast 10 when the device is not in use, the dowel 13 at one end extending beneath the lower end of the mast 10 and the other dowel member extending in a notch 14 provided in the mast near the upper end thereof.

A reel 15 is mounted upon a central pivot 16 which extends into the mast and is anchored thereto. The reel 15 is provided with a projection 17 extending beyond the diameter of the reel for the purpose of actuating the trigger mechanism which will be later described. A fish line 19 of suitable length is wound upon the reel 15 and when partially unwound therefrom may be suspended from the reel. A hook 20 is shown on the line 19, the hook being designed to support suitable bait such as a live minnow.

A flat spring strip 21 is slidably supported by the mast 10, this spring strip extending beneath a series of staples such as 22 which extend into the mast 10. The lower end of the spring strip 21 is provided with a hook shaped extremity 23 which may spring beneath the lower staple 24 to limit the upward sliding movement of the spring. When not in use, this spring strip 21 slides downwardly along side of the mast so that the tip-up is compact when not in use.

A fixed catch 25 projects on the side of the mast opposite to that to which the spring strip is slidably secured. The catch 25 includes a transversely extending extremity 26 which extends on a substantially horizontal plane parallel to the surface of the mast 10 from which the catch projects. The end of the spring strip 21 is angularly bent as indicated at 27 so as to permit the end of the spring strip to engage over the transverse portion 26 of the catch 25.

A generally U-shaped enclosure 29 extends vertically along the side of the mast from which the catch 25 projects, the enclosure being held in place by suitable means such as by staples 30. The enclosure 29 acts as a journal for the vertically extending portion 31 of the trigger mechanism which is indicated in general by the numeral 31. As is evident from Figures 1 and 4 of the drawings, the trigger mechanism includes a right angularly turned lower extremity 32. The upper end of the vertical member 30 extends through a screw eye 33 and then is bent to form a downwardly opening V-shaped element 34 which is slightly above the level of the transverse portion 26 of the catch 25. This V-shaped member 34 is arranged with its apex 35 near the surface of the mast and the V-shaped member 34 is designed to bridge the end of the spring 21 when this spring is engaged with the transverse member 26 of the catch 25. The V-shaped member 34 is rotatable with the vertical member 30 of the trigger mechanism and when the member 30 is turned in one direction, it forces the end 27 of the spring 21 out of engagement with the transverse member 26 of the catch 25.

As a result of this arrangement, when the spring 26 is in looped form as shown in Figure 2 with its extremity 27 engaged with the catch member 26, the right angularly extending lower end 32 projects forwardly from the mast at substantially right angles thereto and is in the path of movement of the projection 17 on the reel 15. Thus, the reel is prevented from unwinding by engagement of the projection 17 against the trigger end 32. Rotation of the trigger member is prevented by the natural friction between the parts and the force necessary to slide the end 27 of the spring 21 from the end of the catch member 26.

It will be seen that no great pull upon the line is required in order to actuate the trigger mechanism. This is normally desirable as a prompt signal is advantageous. However, where the bait is subjected to relatively strong currents such as those experienced in certain portions of rivers, the force of the current against the bait is sometimes sufficient to cause a false signal. This is particularly true where live bait is used, for if a large minnow is impaled upon the hook, the force of this minnow swimming through the water may exert a considerable pull upon the fish line. In order to prevent such false signals and to provide an adjustable means of resisting unwinding of the reel, I provide the mechanism indicated in general by the letter B and best illustrated in Figures 4, 5 and 6 of the drawings.

A U-shaped bracket 36 is mounted upon the mast 10 by any suitable means such as by nails 37 extending through the parallel sides 39 and 40 of the U-shaped member 36. The connecting portion 41 of the U-shaped member 36 is supported in spaced parallel relation to the surface of the mast 10 over which the trigger mechanism 31 extends.

A clamping bolt 42 extends through the center of the connecting member 41 and supports friction washers such as 43 and 44. A retarding arm 45 is provided with a looped end 46 which also encircles the clamping bolt 42 between the friction washers 43 and 44. A clamping nut 47 is provided upon the clamping bolt 42 by means of which the friction washers may be engaged against the looped arm end 46 with any desired amount of friction. Obviously, the tighter the clamping nut 47 is secured, the more will be the resistance to the rotation of the arm 45 about its axis. Figure 5 of the drawings illustrates the arrangement of the parts when the apparatus is set in non-signalling position with the free end 27 of the spring 21 engaged with the catch member 26. In this position, the right angularly turned lower extremity 32 of the trigger mechanism is against the projection 17 on the reel 15 and the arm 45 may be swung against this right angularly turned end 32 of the trigger mechanism at a point spaced forwardly from the mast 10. When thus arranged, the pull upon the line 19 tending to unreel line from the reel is resisted not only by the friction of the trigger mechanism and the force required to disengage the end of the spring 21 from the catch 25, but also by the frictional engagement between the arm 45 and the friction washers 33 and 34. Thus, a greater than normal pull must be exerted upon the line in order to unreel the line and to actuate the trigger mechanism.

By varying the degree to which the nut 47 is tightened, the degree of added resistance to the unreeling of the reel 15 may be varied. The resistance to rotation of the arm 45 may be tested by pivoting this arm after the nut has been tightened. With the added adjustable tension, the tip-up may be used under almost any condition and will function effectively in still water where no additional friction is required or in rivers where the current is swift and where a bait of considerable size is used. If, during use, a false signal is experienced, the apparatus may be raised and the thumb nut 47 may be tightened slightly to correct this difficulty. When not in use, the arm may be swung through an arc of 180 degrees to extend upwardly along the mast so that it will not interfere with the usual operation of the apparatus.

In accordance with the patent statutes, I have described the principles of construction and operation of my improvement in ice fishing tip-up, and while I have endeavored to set forth the best embodiment thereof, I desire to have it understood that changes may be made within the scope of the following claims without departing from the spirit of my invention.

I claim:

1. A tip-up device including a support, a reel supported by said support, said reel having a projection thereon, a trigger mechanism on said support engageable with said reel for operation thereby, a signal, a fixed catch on said support engageable with said signal for holding the same in non-signalling position, said trigger mechanism being engageable with said signal to release the same upon actuation of said trigger mechanism into signalling position, and adjustable tension means engageable with said trigger mechanism for resisting operation thereof, said adjustable tension means comprising an arm pivotally mounted at one end on said support in such a manner that the free end engages a portion of said trigger mechanism when the trigger is in operative position, and adjustable means creating tension upon said arm to resist rotation thereof and thereby resisting rotation of said trigger.

2. The construction described in claim 1 and in which the adjustable means creating tension comprises adjustable friction means encircling the pivotal connection between said arm and said support and engaging said arm to resist pivotal movement thereof.

3. A tip-up signal including a support, a reel pivotally connected to said support, said reel having a projection thereon, a trigger mechanism movably supported by said support in the path of movement of said projection on said reel for engagement thereby, a signal on said support movable from non-signalling position to signalling position, resilient means urging said signal toward signalling position, means forming a part of said trigger means for holding said signal in non-signalling position, and adjustable tension means resisting the actuation of said trigger means by said projection, said adjustable tension means comprising an arm, a pivot connecting one end of said arm to said support in such a manner that the free end engages a portion of said trigger mechanism when the trigger is in operative position, and adjustable friction means on said pivot engaging said arm to resist pivotal movement thereof.

References Cited in the file of this patent
UNITED STATES PATENTS

| | | |
|---|---|---|
| 2,502,231 | Oberg | Mar. 28, 1950 |
| 2,654,972 | Hollingsworth | Oct. 13, 1953 |
| 2,770,906 | Hood | Nov. 20, 1956 |